United States Patent
Houjou

(10) Patent No.: US 9,195,680 B2
(45) Date of Patent: Nov. 24, 2015

(54) NETWORK SYSTEM, MEMBERSHIP-BASED SOCIAL NETWORK SERVICE SYSTEM, IMAGE DISPLAY METHOD, AND STORAGE MEDIUM STORING PROGRAM

(71) Applicant: CASIO COMPUTER CO., LTD., Tokyo (JP)

(72) Inventor: Yoshiharu Houjou, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 301 days.

(21) Appl. No.: 13/833,211

(22) Filed: Mar. 15, 2013

(65) Prior Publication Data

US 2013/0243342 A1  Sep. 19, 2013

(30) Foreign Application Priority Data

Mar. 16, 2012  (JP) .................................. 2012-061151

(51) Int. Cl.
G06F 17/30 (2006.01)

(52) U.S. Cl.
CPC ...... *G06F 17/3028* (2013.01); *G06F 17/30244* (2013.01); *G06F 17/30274* (2013.01)

(58) Field of Classification Search
CPC .......... G06F 17/30274; G06F 17/3028; G06F 17/30244
USPC ................. 707/708, 731, 737, 771, E17.046, 707/E17.089
See application file for complete search history.

(56) References Cited

U.S. PATENT DOCUMENTS

| | | | |
|---|---|---|---|
| 8,253,806 B2 * | 8/2012 | Mikawa et al. ............ 348/207.1 |
| 2002/0030748 A1 * | 3/2002 | Kitaguchi et al. ............ 348/218 |
| 2008/0098455 A1 * | 4/2008 | Hirahara ............................ 726/1 |
| 2009/0154474 A1 * | 6/2009 | Arima et al. ................... 370/400 |
| 2009/0157696 A1 * | 6/2009 | Mikawa et al. ................... 707/10 |
| 2010/0128058 A1 * | 5/2010 | Kawabata et al. ............ 345/593 |
| 2010/0283586 A1 * | 11/2010 | Ikeda et al. ................ 340/10.42 |
| 2011/0137900 A1 * | 6/2011 | Chang et al. ................... 707/737 |
| 2011/0270839 A1 * | 11/2011 | Jensen et al. ................... 707/737 |

FOREIGN PATENT DOCUMENTS

| | | |
|---|---|---|
| JP | 2003-216653 A | 7/2003 |
| JP | 2004-5388 A | 1/2004 |
| JP | 2006-099753 A | 4/2006 |
| JP | 2007-264985 A | 10/2007 |

(Continued)

OTHER PUBLICATIONS

Korean Office Action date of mailing Aug. 14, 2014 for KR 10-2013-0028339 and English translation of the same (6 pages).

(Continued)

*Primary Examiner* — Phong Nguyen
(74) *Attorney, Agent, or Firm* — Fitch Even Tabin & Flannery LLP

(57) ABSTRACT

There is provided a network system in which image data items are uploaded from a plurality of user terminals to a server and images are opened to public among the users. The system includes a category division unit configured to divide the works classified into the categories into a first group of works with each of which the counted browse request number of times is greater than or equal to a predetermined number, and a second group of works other than the works in the first group, and classify one of the first and second groups of the divided works as another category different from the categories.

5 Claims, 12 Drawing Sheets

(56) References Cited

FOREIGN PATENT DOCUMENTS

| | | |
|---|---|---|
| JP | 2008-242639 A | 10/2008 |
| JP | 2009-181262 A | 8/2009 |
| KR | 10-2003-0082467 A | 10/2003 |

OTHER PUBLICATIONS

Office Action issued in counterpart Japanese Application No. 2012-061151 dated Jan. 7, 2014 and English translation of the same (8 pages).

* cited by examiner

NETWORK SYSTEM, MEMBERSHIP-BASED SOCIAL NETWORK SERVICE SYSTEM, IMAGE DISPLAY METHOD, AND STORAGE MEDIUM STORING PROGRAM

CROSS-REFERENCE TO RELATED APPLICATIONS

This application is based upon and claims the benefit of priority from prior Japanese Patent Application No. 2012-061151, filed Mar. 16, 2012, the entire contents of which are incorporated herein by reference.

BACKGROUND OF THE INVENTION

1. Field of the Invention

The present invention relates to an SNS system, image display method, and storage medium storing a program, capable of displaying an image contributed by a user in a network system such as a social network service or the like so that it can be easily viewed in accordance with the access status of the user.

2. Description of the Related Art

In recent years, membership-based communication services (social network services, hereinafter referred to as SNSs) have become widespread. An SNS system is a network which generally takes the form of a semi-lattice structure, and in which an aggregate of predetermined units called an actor is used as a node, and an edge serving as a relationship between edges is constructed. A technique of automatically grouping actors in accordance with a keyword is proposed (for example, Jpn. Pat. Appln. KOKAI Publication No. 2006-99753).

In such an SNS, members often show photographs accumulated on a server to each other through the network (for example, Jpn. Pat. Appln. KOKAI Publication No. 2008-242639).

Hereinafter, a photograph which is uploaded to the server by a user, and is opened to the public on the network as it is or after being subjected to image processing is referred to as a "work".

Furthermore, a technique of evaluating works contributed to the network is also proposed (for example, Jpn. Pat. Appln. KOKAI Publication No. 2009-181262).

According to the technique described in Pat. Document 2, it is possible to carry out exchange of works between users, and evaluation of the works quickly and easily.

However, when a large number of users contribute a large number of works to the server, browsability of the works is degraded because the number of works which can be displayed at a time is limited.

Thus, it is conceivable that a user is enabled to access a work desired by the user by classifying the works into a plurality of categories. A technique of appropriately creating categories, and consolidating the categories is also proposed (for example, Jpn. Pat. Appln. KOKAI Publication No. 2007-264985).

However, in the technique described in Jpn. Pat. Appln. KOKAI Publication No. 2006-99753, keyword groups and names relevant to the groups are only correlated to each other to be grouped and, in the technique described in Jpn. Pat. Appln. KOKAI Publication No. 2009-181262, classification of the categories is carried out simply in accordance with the number of works, and hence there has been a problem that these techniques are not always easy to use for the users.

Under these circumstances, it is desired to provide a network system, membership-based social network service system, image display method, and storage medium storing a program, capable of displaying works accumulated on a server in an SNS or the like efficiently through a network and by classifying the works into categories in accordance with the interest of the user.

BRIEF SUMMARY OF THE INVENTION

According to one aspect of the present invention, there is provided a network system in which image data items are uploaded from a plurality of user terminals to a server and images are opened to public among the users, the system comprising: an uploaded image storage unit configured to store image data items uploaded from the terminals; a work storage unit configured to store a plurality of image data items stored in the uploaded image storage unit as works for publication; a classification unit configured to classify the plurality of works stored in the work storage unit into a plurality of categories; a display control unit configured to display the works for each of the categories on a display device of the terminal; a browse request unit configured to select a work from the terminal and make a browse request; a count unit configured to receive a browse request from the terminal and count the browse request number of times; and a category division unit configured to divide the works classified into the categories into a first group of works with each of which the counted browse request number of times is greater than or equal to a predetermined number, and a second group of works other than the works in the first group, and classify one of the first and second groups of the divided works as another category different from the categories.

According to another aspect of the present invention, there is provided a membership-based social network service system in which image data items are uploaded from a plurality of member terminals to a server and images are opened to public among the users who are members, the system comprising: an uploaded image storage unit configured to store image data items uploaded from the member terminals; a work storage unit configured to store a plurality of image data items stored in the uploaded image storage unit as they are or after subjecting the image data items to image processing as works for publication; a classification unit configured to classify the plurality of works stored in the work storage unit into a plurality of categories; a display control unit configured to display the works for each of the categories in a form of a list on a display device of the member terminal; a browse request unit configured to select a work from the member terminal and make a browse request; a determination unit configured to receive a browse request from the member terminal and count the browse request number of times, and detect a user ID to determine whether or not the user is a member; a transmission unit configured to transmit the work to the corresponding member terminal in accordance with a determination result of the determination unit; and a category division unit configured to divide the works classified into the categories into a first group of works with each of which the browse request number of times is greater than or equal to a predetermined number, and a second group of works other than the works in the first group, and classify one of the first and second groups of the divided works as another category different from the categories.

According to still another aspect of the present invention, there is provided an image display method for use in a network system in which image data items are uploaded from a plurality of user terminals to a server and images are opened to public among the users, the method comprising: storing a plurality of image data items uploaded from the terminal as they are or after subjecting the image data items to image processing as works for publication; classifying each of the works into one of a plurality of categories; displaying the works for each of the categories on a display device of the terminal; receiving a browse request of a work from the terminal and counting the browse request number of times; and dividing the works classified into the categories into a first group of works with each of which the counted browse request number of times is greater than or equal to a predetermined number, and a second group of works other than the works in the first group, and classifying one of the first and second groups of the divided works as another category different from the categories.

According to still another aspect of the present invention, there is provided a non-transitory storage medium having stored therein a computer readable program for controlling a computer of a server in which image data items are uploaded from a plurality of user terminals to the server and images are opened to public among the users, to perform functions comprising: storing a plurality of image data items uploaded from the terminal as they are or after subjecting the image data items to image processing as works for publication; classifying each of the works into one of a plurality of categories; displaying the works for each of the categories in a form of a list on a display device of the terminal; receiving a browse request of a work from the terminal; receiving a browse request, and counting the browse request number of times; and dividing the works classified into the categories into a first group of works with each of which the counted browse request number of times is greater than or equal to a predetermined number, and a second group of works other than the works in the first group, and classifying one of the first and second groups of the divided works as another category different from the categories.

According to still another aspect of the present invention, there is provided a server in a network system in which image data items are uploaded from a plurality of user terminals to a server and images are opened to public among the users, the server comprising: an uploaded image storage unit configured to store image data items uploaded from the terminals; a work storage unit configured to store a plurality of image data items stored in the uploaded image storage unit as works for publication; a classification unit configured to classify the works stored in the work storage unit into a plurality of categories; a display control unit configured to display the works for each of the categories on a display device of the terminal; a count unit configured to receive a browse request from the terminal and count the browse request number of times; and a category division unit configured to divide the works classified into the categories into a first group of works with each of which the counted browse request number of times is greater than or equal to a predetermined number, and a second group of works other than the works in the first group, and classify one of the first and second groups of the divided works as another category different from the categories.

With such implementations, it is possible to display a list of works classified into categories while appropriately increasing/decreasing the number of categories in accordance with the popularity of the works with the users, and hence it is possible for the users to efficiently browse the works.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be described with reference to the drawings.

Embodiment

Figure 1:
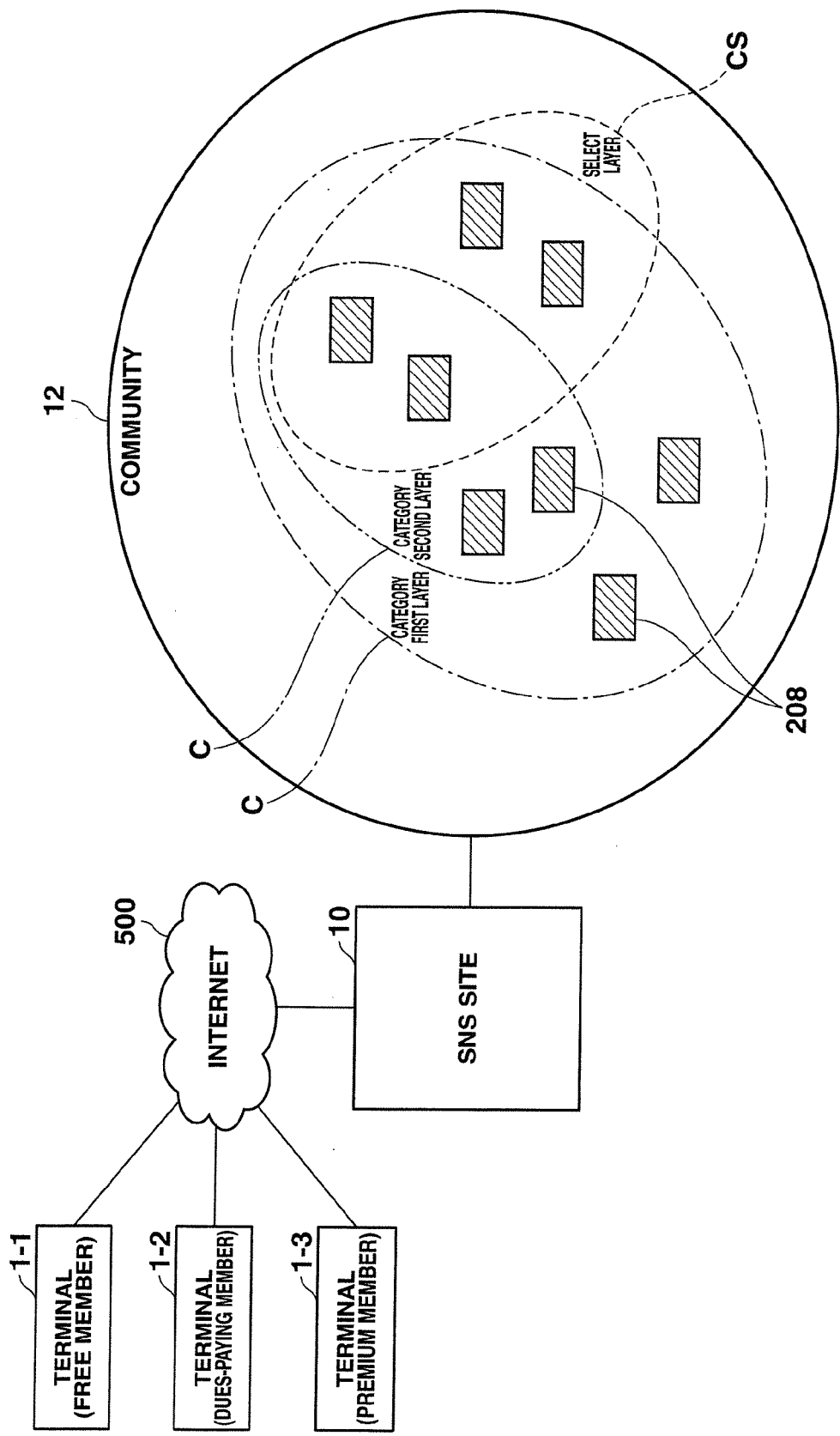
FIG. 1 is a block diagram showing the configuration of a network system of an SNS system in an embodiment of the present invention.

FIG. 1 is a block diagram showing the configuration of a network system of an SNS system which is an embodiment of the present invention. A reference symbol 10 denotes an SNS site including a server 11, and the SNS site 10 is connected to a plurality of user terminals through the Internet 500. The terminals may be smartphones or ordinary personal computers. It is assumed that the users are constituted of various members to be described later, and a reference symbol 1-1 denotes a terminal of a free member, 1-2 denotes a terminal of a dues-paying member, and 1-3 denotes a terminal of a premium member.

The SNS site 10 includes a work contribution community 12, and can carry out preservation of image data (mainly image data of photographs taken by digital cameras) uploaded from the users through the terminals 1-1, 1-2, 1-3, . . . , image processing such as conversion and the like of the uploaded image data into a pictorial image, and show the uploaded image data, and image data after being subjected to image processing to the public on the network as works 208 to thereby make other users browse the image data. In fact, the work contribution community 12 conceptually shows what is developed on the server 11 of the SNS site 10. More specifically, as will be described later, the plurality of works 208 are classified into a category C of a plurality of layers, and are also classified as a select layer CS.

Figure 2:
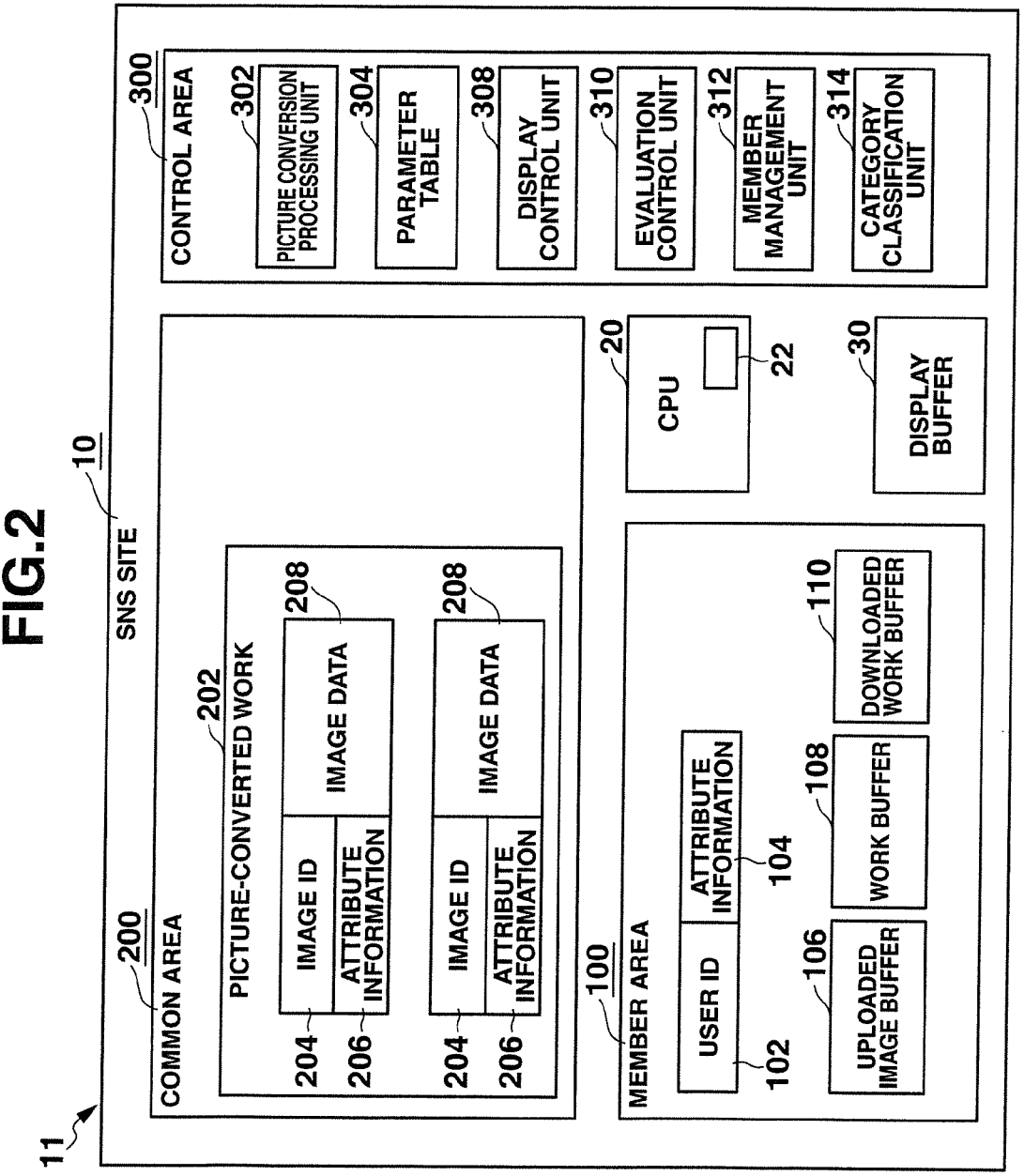
FIG. 2 is a block diagram showing the schematic configuration of a server realizing an SNS site in the embodiment.

FIG. 2 is a block diagram showing a main part of the configuration of the server 11 realizing the SNS site 10. The server 11 is provided with a member area 100, common area 200, and control area 300.

The member area 100 is an area to be provided for each registered member, and includes a user ID 102 configured to recognize a member, and various attribute information items 104 for each user corresponding to the user ID 102.

Figure 3:
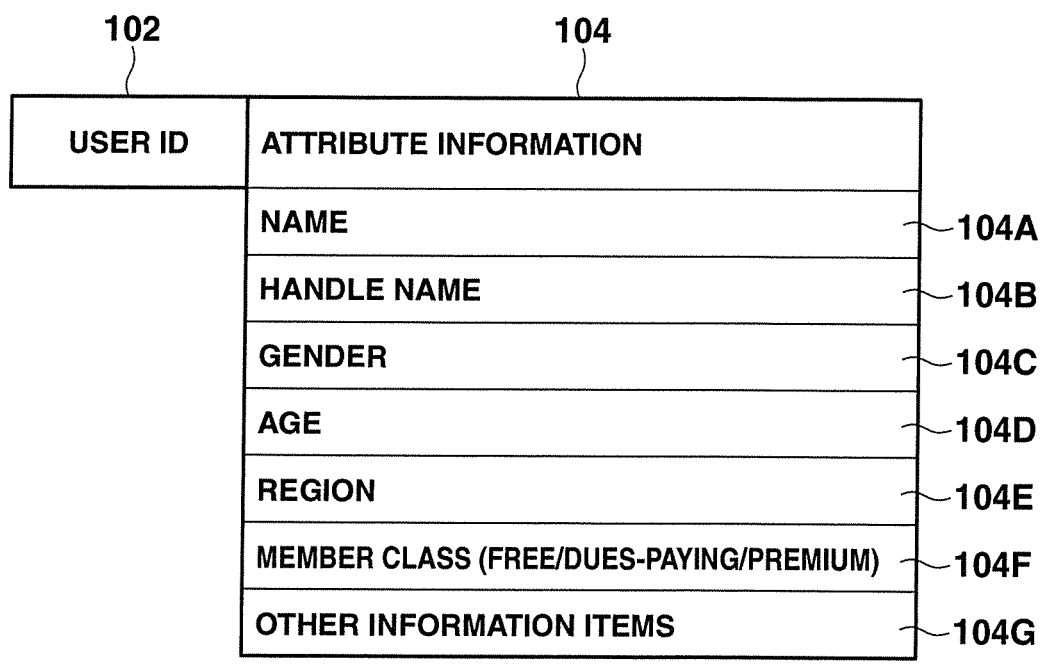
FIG. 3 is a view showing attribute information of a user ID in the embodiment.

The attribute information items 104 are as shown in, for example, FIG. 3, a name 104A, handle name 104B, gender 104c, age 104D, region 104E, member class 104F, and other information items 104G proper to the user. The member class 104F includes a free member who is only free-registered, dues-paying member who is paid-registered, and premium member who has paid a special fee.

Further, a reference symbol 106 denotes an uploaded image buffer area in which image data items of photographs uploaded by the users are stored, 108 denotes a work buffer area in which pictorial images (works) picture-converted in the SNS site 10 are stored, and 110 denotes a downloaded work buffer area in which downloaded works of other users are stored.

The common area 200 is an area provided in common with all the users, and includes a work area 202 in which a large number of works obtained by converting images uploaded by the users into pictorial images are stored. This work area 202 is to be classified into a plurality of categories as will be described later.

In each work to be stored in the work area 202, an image ID 204 used to identify the work, and attribute information 206 of the work are stored together with image data 208.

Figure 4:
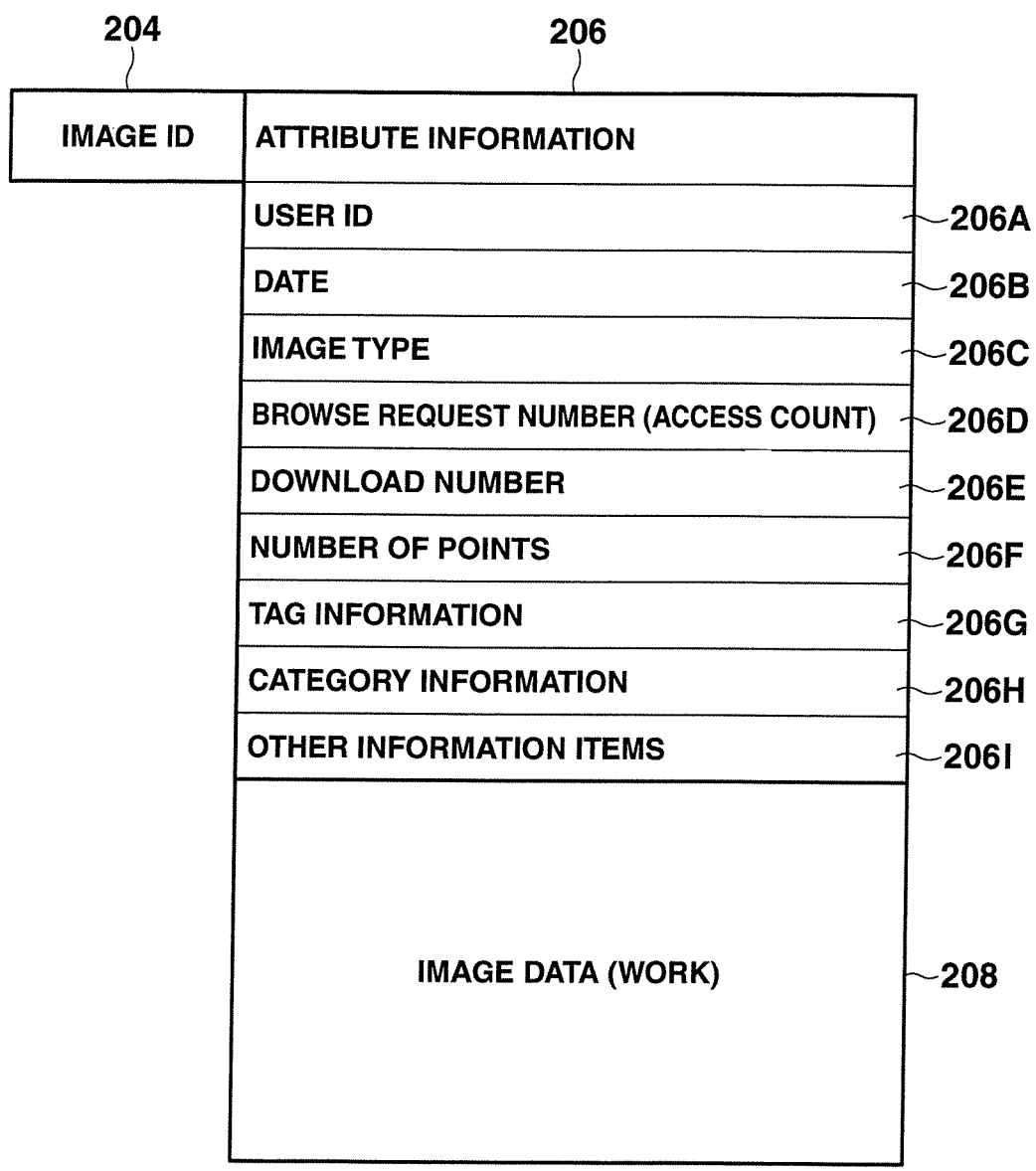
FIG. 4 is a view showing attribute information of an image ID in the embodiment.

The attribute information 206 stores therein, as shown in FIG. 4, a user ID 206A indicating a contributor of the work, date information 206B such as a date of preparation or a date of contribution, image type information 206C such as a size of the image data, and type or the like of the tone of the picture, browse request number (access count) information 206D indicating the number of times the work has been browsed, download number information 206E indicating the number of times the work has been downloaded, number of points information 206F indicating the evaluation of the work, tag information 206G accompanying a tag indicating what the work is associated with such as a person, nature, flower, morning glory, ..., and the like, category information 206H indicating which category the work belongs to, and other information items 206I proper to the work.

It is possible by the user ID 206A to find out the creator of the work, and determine whether the creator is a free-member or a dues-paying member or a premium member. Further, it is possible by the tag information 206G to classify the work as a category. Further, it is possible by the category information 206H to learn as which category the work is classified.

The control area 300 includes a picture conversion processing unit 302, parameter table 304, display control unit 308, evaluation control unit 310, member management unit 312, and category classification unit 314.

The picture conversion processing unit 302 carries out picture conversion processing of converting image data stored in the uploaded image buffer area 106 into pictorial image data. The parameter table 304 stores therein parameters for picture conversion to which the picture conversion processing unit 302 refers in the picture conversion processing. The display control unit 308 stores therein a control program configured to display a work on a screen.

The evaluation control unit 310 carries out evaluation of a work stored in the work buffer area 108 of the member area 100, the evaluation being corresponding to the number of access times and the like, and imparts points to each work. The member management unit 312 manages the members by the user IDs, and controls services for the free members, dues-paying members, and premium members. The member management unit 312 also manages the SNS function of the SNS site 10.

Further, the server 11 is provided with a CPU 20, and display buffer 30. The CPU 20 controls the whole server 11, and carries out various processing items necessary for displaying a list of a large number of works on the Internet. Further, the CPU 20 is provided with a graphic accelerator 22 used to carry out a high degree of graphic processing. It becomes possible by the graphic accelerator 22 to display images by category as will be described later by only specifying some conditions from the driver software. It should be noted that the aforementioned driver software is, for example, a heretofore known open GL with a high degree of versatility, and extended library configured to use the open GL.

The display buffer 30 is a working memory configured to develop an image for display when the CPU 20 displays a large number of works in a form of a list.

Hereinafter, specific operations of the image display system of the embodiment will be described with reference to the flowchart.

Figure 5:
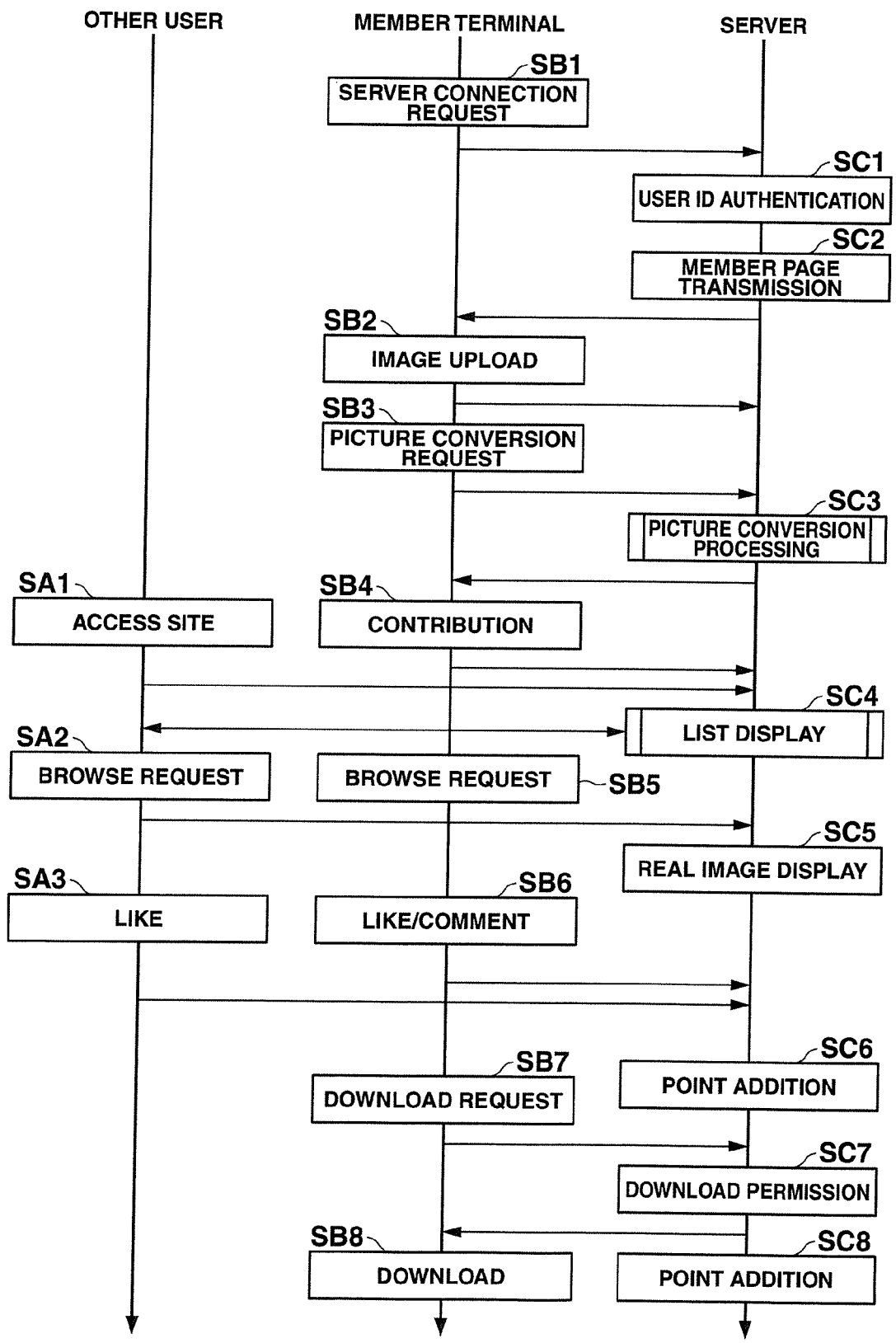
FIG. 5 is a process chart for showing an exchange of data between a terminal and the server in the embodiment.

First, with reference to FIG. 5, the process to be executed when an upload, display, browse, or download of an image is carried out between the terminals 1-1, 1-2, 1-3, ... and server 11 of the SNS site 10 will be described below.

When the user is a member (a dues-paying member or a premium member), the user accesses the SNS site 10 from the user's own terminal 1 (step SB1). The server 11 authenticates the user ID 102 by the login of the user (step SC1) and, when it is confirmed that the user is a member, transmits a page of the member so that the page can be viewed from the member (step SC2).

When the user's own page is opened, the user carries out an upload of an image (step SB2). The uploaded image is stored in the uploaded image buffer area 106 of the member area 100 of the server 11. When the member requests picture conversion of the image (step SB3), picture conversion is carried out in the server 11 (step SC3), and the converted image, i.e., the work is stored in the work buffer area 108.

Although the member may personally enjoy the work after being subjected to conversion as it is, when the member wishes to open the work to other users, the member contributes the work (step SB4). The contributed work is transferred from the work buffer area 108 of the member area 100 to the work area 202 of the common area 200 to be stored therein. It should be noted that attribute information 206 as described in FIG. 4 is also added to the work in the work area 202. In contributing the work, the user adds a tag indicating what the work is associated with, e.g., a person, nature, flower, morning glory, ... to the work. These tags are prepared in advance in the SNS site 10.

Works in the work area 202 are displayed by the server 11 in a form of a list as the need arises (step SC4).

Figure 7:
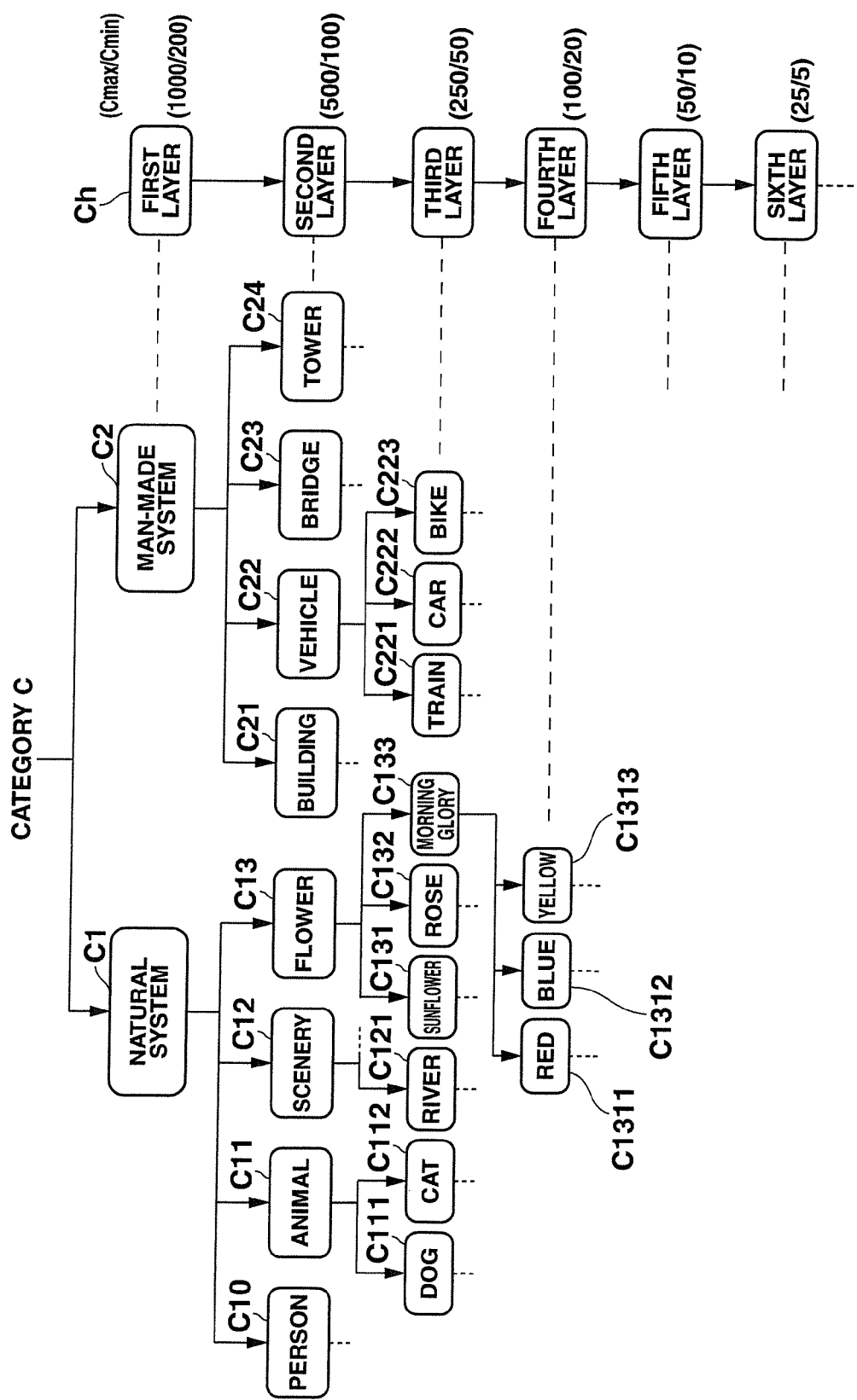
FIG. 7 is a view for explaining a concept of category classification.
Figure 8:
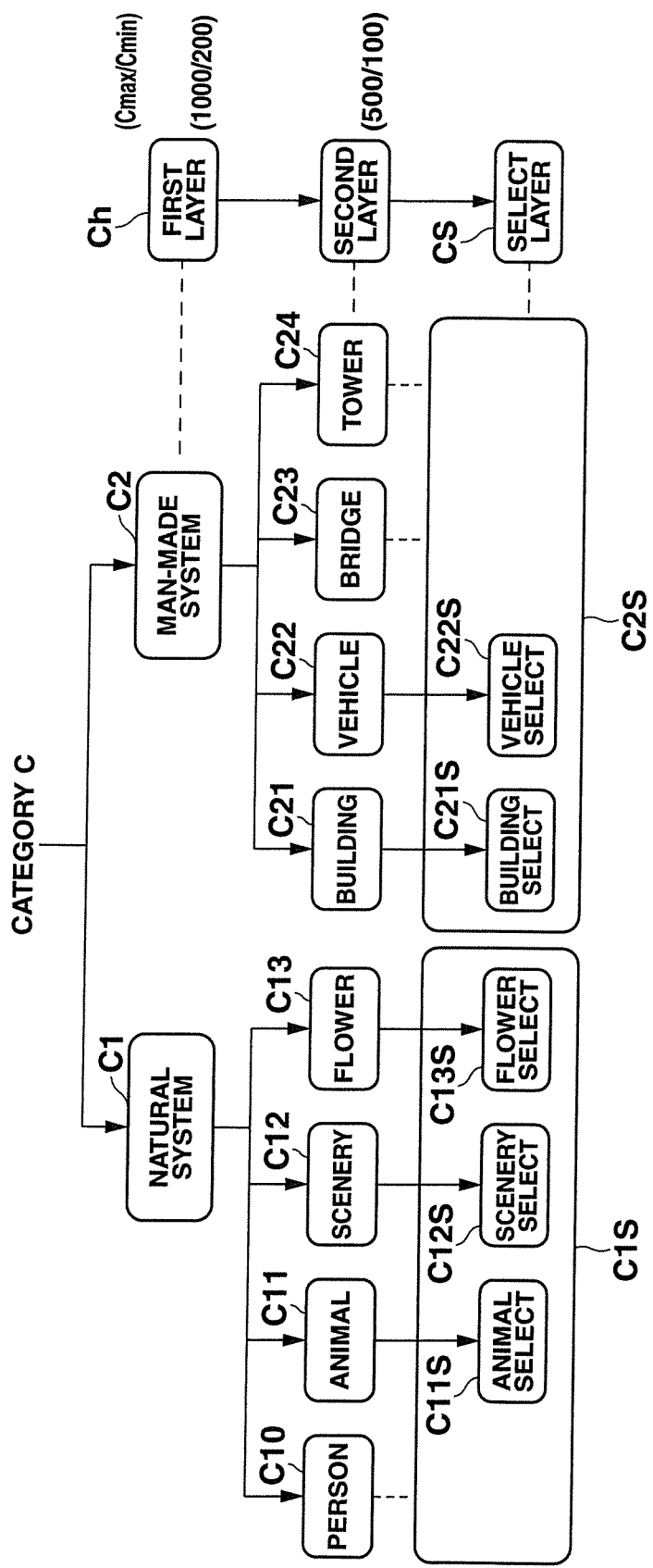
FIG. 8 is a view for explaining a state where categories having large access counts in the embodiment are grouped.

The CPU 20 of the server 11 cooperates with the graphic accelerator 22 to prepare display data in the work display buffer 30 in accordance with the display control program of the display control unit 308 so that the data can be displayed on the member terminals and terminals of other users. In list-displaying, the works in the work area 202 are appropriately reduced in size to prepare a thumbnail. At this time, a plurality of works are displayed by being classified by category on the screen as shown by the display image in FIG. 12. Although described later, FIGS. 7 and 8 shows a state where a plurality of works are classified as categories C1, C2, C12, C13, . . . to be stored in the work area 202 of the server 11. Although actually a huge number of works are stored, an arrangement of works is made so that part of the works corresponding to one screen can be displayed by the control of the display control unit 308, and the arranged works are sent to the display buffer 30 and are made viewable by the terminals 1-1, 1-2, . . . .

Figure 12:
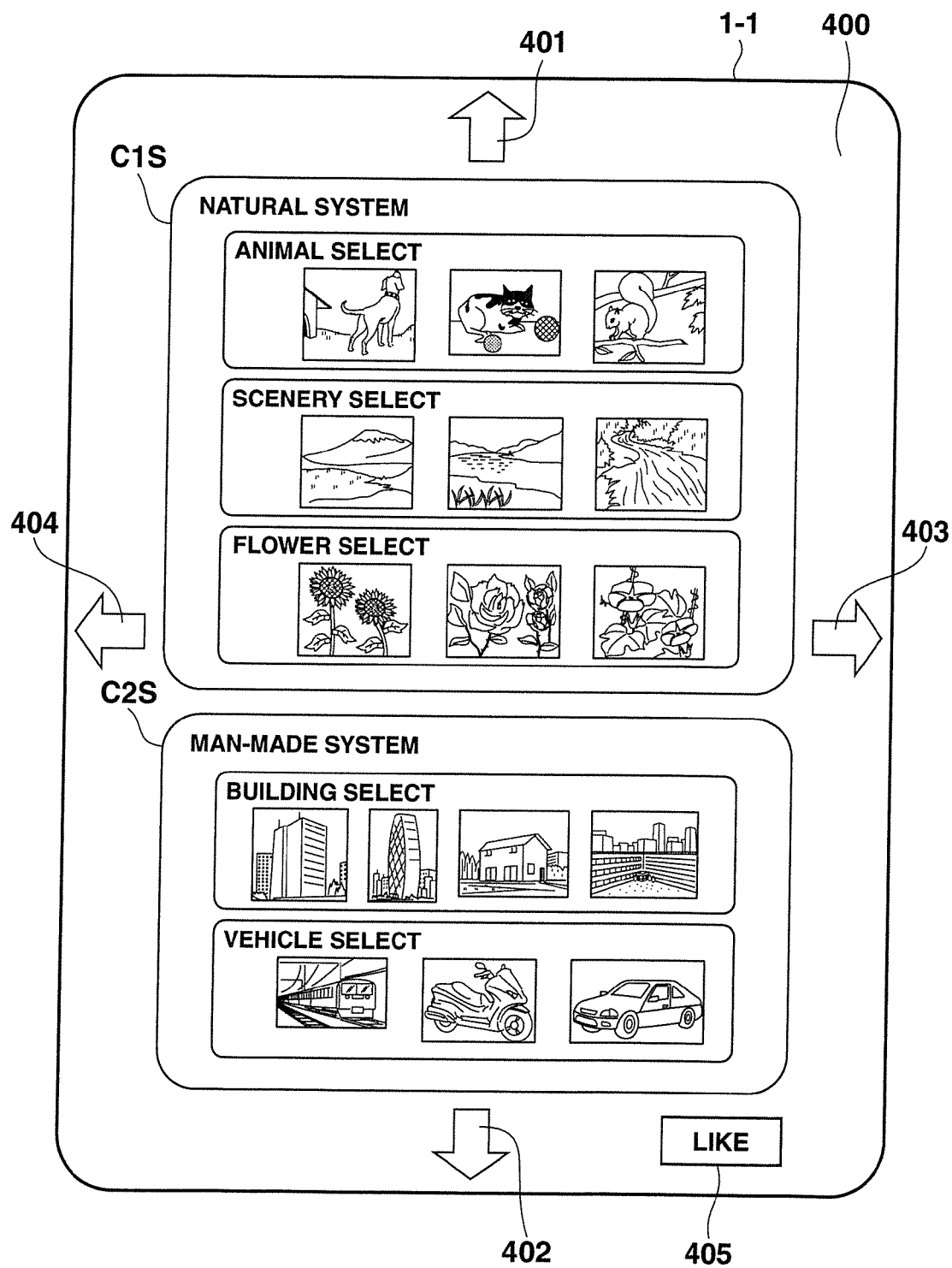
FIG. 12 a view showing images of a display screen in a terminal in the embodiment.

FIG. 12 shows a display image of a display screen 400 of an arbitrary terminal (for example, 1-1). As shown in FIG. 12, a thumbnail of a plurality of works classified by category as a natural system, scenery, flower, man-made system, building, and vehicle is displayed. The display screen 400 is constituted of a touch panel, and a work can be selected by touching the work part on the thumbnail. The selection is fixed by double touch, a browse request is made (step SB5), and the real image of the selected work is fully displayed on the screen (step SC5).

Reference symbol 405 denotes a LIKE button and, when the button is tapped if the selected work is liked, a LIKE point is added to the work.

In FIG. 12, reference symbol 401 on the display screen 400 denotes a key used to scroll the display in the upper layer direction, and 402 denotes a key used to scroll the display in the lower layer direction. Further, reference symbols 403 and 404 are keys used to scroll the works in the right and left directions in order to view different works on the same layer. Accordingly, when a first layer and second layer are displayed, by operating the scroll keys 403 and 404, other works are displayed while keeping the categories of the natural system, scenery, flower, man-made system, building, and vehicle are as they are and, by depressing the scroll key 402, works of the third layer and fourth layer are displayed. When the scroll key 401 is depressed, works of the second layer and first layer are displayed. These scroll keys are contrived from the fact that a large number of works cannot be fully displayed within one screen, and other display modes may be employed.

As described previously, by issuing a request for a browse from the terminal (step SB5), it is possible for the user to browse a real image of an arbitrary list-displayed work. Upon receipt of a request for a browse, the server 11 displays a real image of the requested work (step SC5) and, adds a point to the work for which the request for a browse has been made (step SC6).

Further, the member can tap the LIKE button 405 indicating approval of the browsed work (step SB6). When the LIKE button 405 is tapped, the server 11 increases the number of points of the attribute information of the browsed work (step SC6). Thereby, the evaluation of the work is raised.

Further, the member can request a download of the browsed work (step SB7). Upon receipt of the request for a download, the server 11 permits the member to carry out a download as the need arises (step SC7), and the member can download the browsed work only when the download is permitted (step SB8). The downloaded work is stored in the downloaded work buffer 110 of the member area 100.

Further, also upon receipt of a request for a download of a work, the server 11 adds a point to the work (step SC8).

On the other hand, a user other than the members, i.e., a free member appropriately accesses the SNS site 10 (step SA1), whereby the free member can browse a work stored in the work area 202 of the common area 200 in a state where the work is displayed in a form of a list. Furthermore, also the free member can browse a real image of an arbitrary list-displayed work by requesting a browse (step SA2).

Further, also when the free member approves the browsed work, and taps the LIKE button (step SA3), the server 11 adds a point to the browsed work (step SC6).

Figure 6:
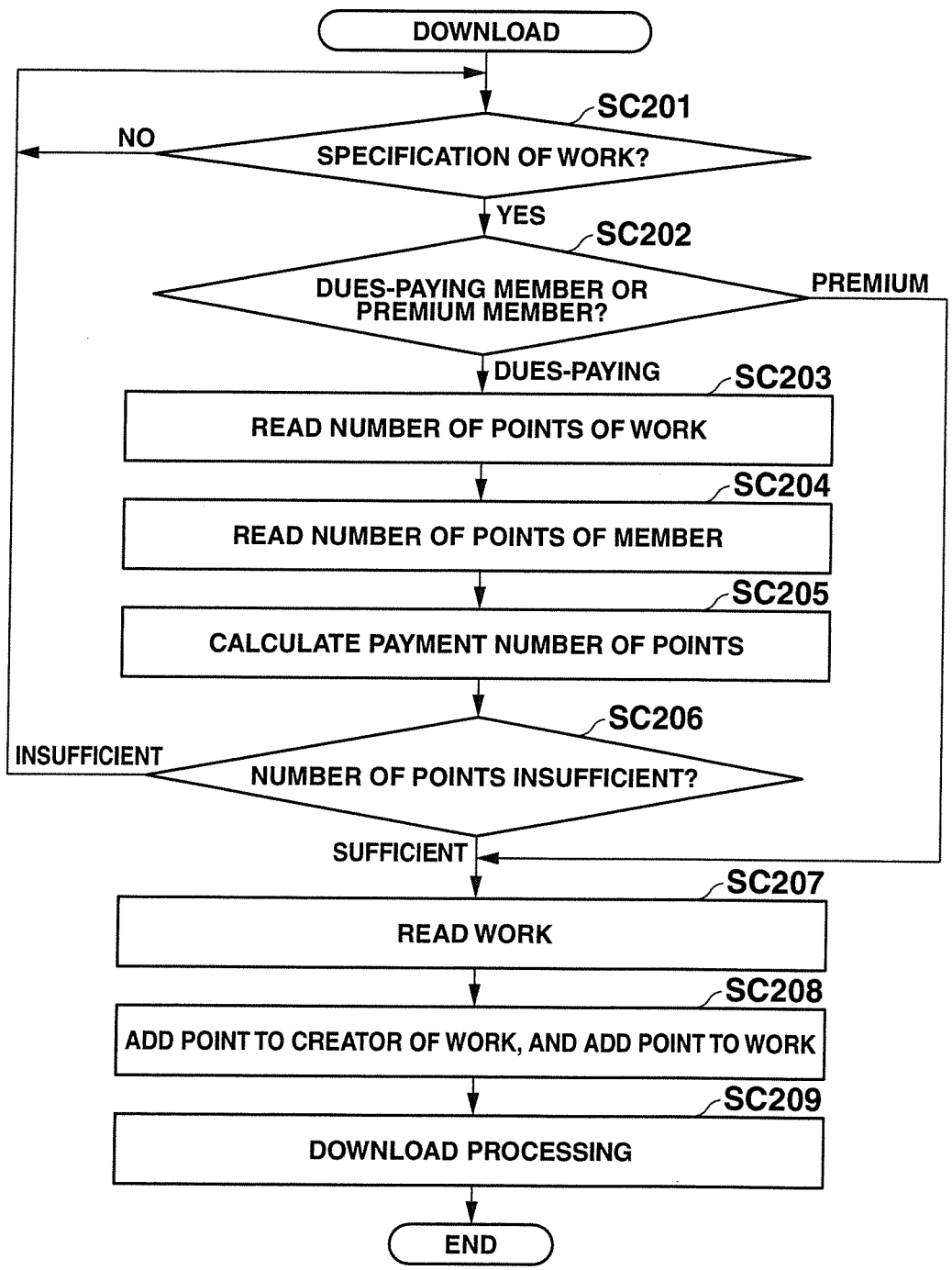
FIG. 6 is a view for explaining an operation of the server associated with download of an image in the embodiment.

FIG. 6 is a flowchart showing processing associated with the download in the server 11. It should be noted that the processing of FIG. 6 is carried out by the CPU 20, evaluation control unit 310, and member management unit 312 of the server 11.

In the server 11, when a work desired to be downloaded is specified by an ordinary dues-paying member or a premium member (step SC201), it is determined by the member management unit 312 whether the user is a dues-paying member or a premium member (step SC202) and, when the user is a premium member, the flow is immediately advanced to step SC207 to be described later.

On the other hand, when the user is a dues-paying member other than the premium member, a number of points corresponding to the evaluation of the work is read from the attribute information 206 of the work in question (step SC203), and a retained number of points is read from the attribute information of the member who is going to carry out a download (step SC204).

Next, a payment number of points is calculated from a difference between the number of points (corresponding to the price) of the work and number of points held by the member (step SC205) and, when the difference is sufficient for the payment number of points, the flow is advanced to step SC207 and, when the difference is insufficient for the payment number of points, the work cannot be downloaded, and hence the flow is returned to step SC201, and the user is made to select some other work.

Further, in the server 11, when the work in question can be downloaded, the CPU 20 reads the work specified by the user from the work buffer area 108 of the other user who is the creator of the work (step SC207), and the evaluation control unit 310 adds a point to each of the creator of the work in question, and the work (step SC208). That is, the system is contrived in such a manner that regarding the ordinary dues-paying member or the premium member, the more the downloaded works created by the member, the higher the evaluation of the works becomes, and a point is added to the number of points area of the attribute information of the user ID of the member who is the creator, whereby the retained number of points of the member is increased.

Thereafter, in the server 11, the CPU 20 carries out download processing of storing the work read in step SC207 in the downloaded work buffer 110 of the user who has requested the download (step SC209).

FIG. 7 is a view for explaining a concept of category classification. The category classification is executed in accordance with the flowchart of FIG. 10 to be described later.

The category C is constituted in such a manner that the category C is in a layered state as shown by Ch and is classified, for example, in the first layer, as the natural system C1, man-made system C2, . . . . The natural system C1 is classified, in the second layer, as the person C10, animal C11, scenery C12, flower C13, . . . and, when attention is paid to the flower C13, the flower C13 is classified, in the third layer, as the sunflower C131, rose C132, morning glory C133, . . . .

Furthermore, when attention is paid to the morning glory C133, the morning glory C133 is classified, in the fourth layer, as red C1311, blue C1312, yellow C1313, . . . .

Hereinafter, likewise, the animal C11 is classified as the dog C111, cat C112, . . . , the man-made system C2 is classified as the building C21, vehicle C22, bridge C23, tower C24, . . . , the vehicle C22 is classified as the train C221, car C222, bike C223, . . . . The above is only an example, and classification of a more number of layers, and multi-category may be employed.

Numerals Cmax shown on the right of each of the first to the sixth layers indicates the maximum number of works which can be classified into the category in question, and the numerals Cmin indicates the minimum number.

These categories are prepared in advance together with the tag information, and are identified by the tags. That is, when the user contributes a work to the SNS site 10, the user selects a tag by himself or by herself. For example, when a photograph of a blue morning glory is contributed, the user checks tags of the natural system, flower, morning glory, and blue. The user himself or herself can attach a new tag not prepared in the SNS site 10. For example, tags of summer, morning, and the like which come to mind may be added. When a tag of a lower layer is attached to a work, the SNS site 10 automatically imparts a tag of an upper layer to the work. The tag information for the work is attached to 206G.

FIG. 8 is a view for explaining a state where categories having large access counts in the embodiment are checked and grouped, whereby category select CS is created. This category checking is executed in accordance with the flowchart of FIG. 11 to be described later. In FIG. 7, although the concept of category classification has been shown, in this embodiment, the category select CS is created from the categories of the second layer in accordance with the access count.

For example, works classified as the category animal C11 are sequentially checked, and works having access counts greater than or equal to a predetermined number (for example, 100 access times/day or greater) are collected into one group, and are classified as the category animal select C11S. Likewise, the category scenery select C12S is created from the category scenery C12, the category flower select C13S is created from the category flower C13, the category building select C21S is created from the category building C21, and the category vehicle select C22S is created from the category vehicle C22. Regarding each of the category person C10, category bridge C23, and category tower C24, works accessed the predetermined number of times or more are not found, and hence the category select CS is not created. For convenience' sake, the category select CS of the second layer of the category natural system C1 is called the natural system category select C1S, and the category select CS of the second layer of the category man-made system C2 is called C2S. Further, the transversal layer of the category select CS is called the select layer and is denoted by the same reference symbol CS for convenience' sake.

It should be noted that although the category select CS has been created from the category of the second layer, this is only an example, and the category select CS may be created from the third layer or the fourth layer. Furthermore, the "predetermined access count" may be changed for each layer, and the "predetermined access count" may be changed in accordance with the number of works classified as the category in question. For example, it is conceivable that, for example, among works classified as the category in question, the works within the upper 10% in access count are moved to the category select CS.

Further, the access count may be checked not in units of works, but in units of categories and, for example, when the total access count of the category morning glory C133 in FIG. 7 is greater than the total access count of the sunflower C131 or the rose C132 of another category in the same layer, the category morning glory C133 may be made the category select CS.

In FIG. 8, although the category select CS of the first layer is collectively made the natural system category select C1S, and man-made system category select C2S, this is contrivance configured to make the display easy to see. The display is executed by a program stored in the display control unit 308.

The category configuration shown in FIG. 7, and category configuration shown in FIG. 8 are not contradictory to each other and, FIG. 7 shows the concept of categorization and, FIG. 8 shows this embodiment. In a general SNS semi-lattice structure, overlap between groups is permitted.

Figure 9:
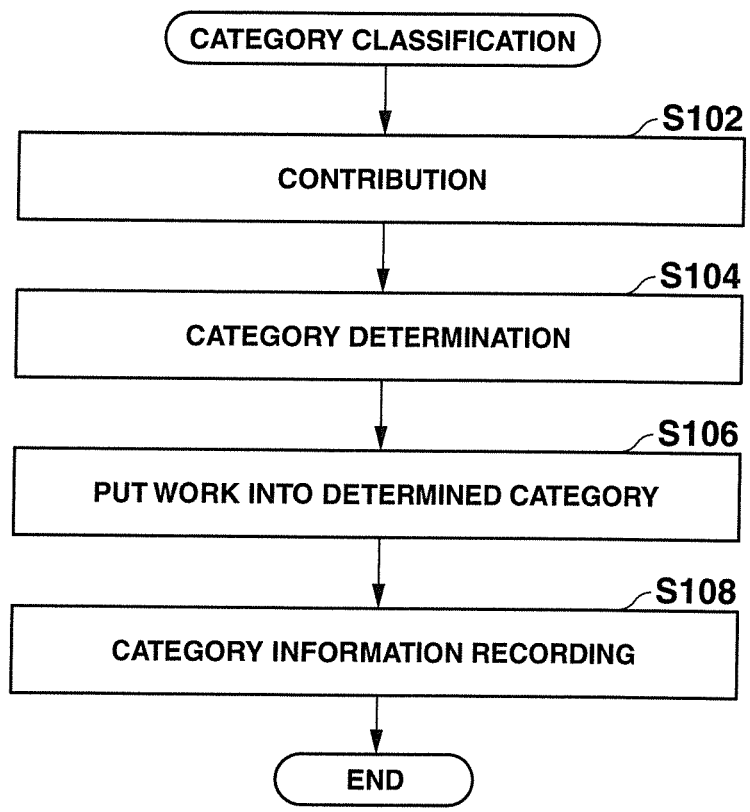
FIG. 9 is a flowchart for explaining processing of grouping by category.

FIG. 9 is a schematic flowchart for explaining processing of categorization. The CPU 20 executes this processing in accordance with the program stored in the category classification unit 314.

First, contribution of a work is accepted (step S102). This corresponds to step SB4 in FIG. 5.

Subsequently, the category of the contributed work is determined (step S104). That is, it is determined to which of categories shown in FIG. 7 the work corresponds. Further, the work is classified as the category storage areas C1, C2, . . . of the work area 202 (step S106) as shown in FIG. 9. The category names C1, C2, . . . , and category storage areas C1, C2, . . . correspond to each other, and hence they are denoted by the same reference symbols. The storage areas may not be physically separated from each other as previously described.

Furthermore, information indicating as which category the work is classified is recorded as category information 206H (step S108). It should be noted that in the determination method used here, when a tag of a category is attached to the work by the user by himself or by herself (206G in FIG. 4), the tag information is subjected to determination. Further, determination may be carried out by image recognition. Methods of recognizing an object are variously developed by image recognition from image data, and recognition is realizable to a degree of the "blue morning glory". The method itself of image recognition is not within the scope of the present invention, and hence is omitted.

When the "blue morning glory" has at this moment only three layers, and a fourth layer is not present yet, the work is classified as the category morning glory (C133 in FIG. 7).

Figure 10:
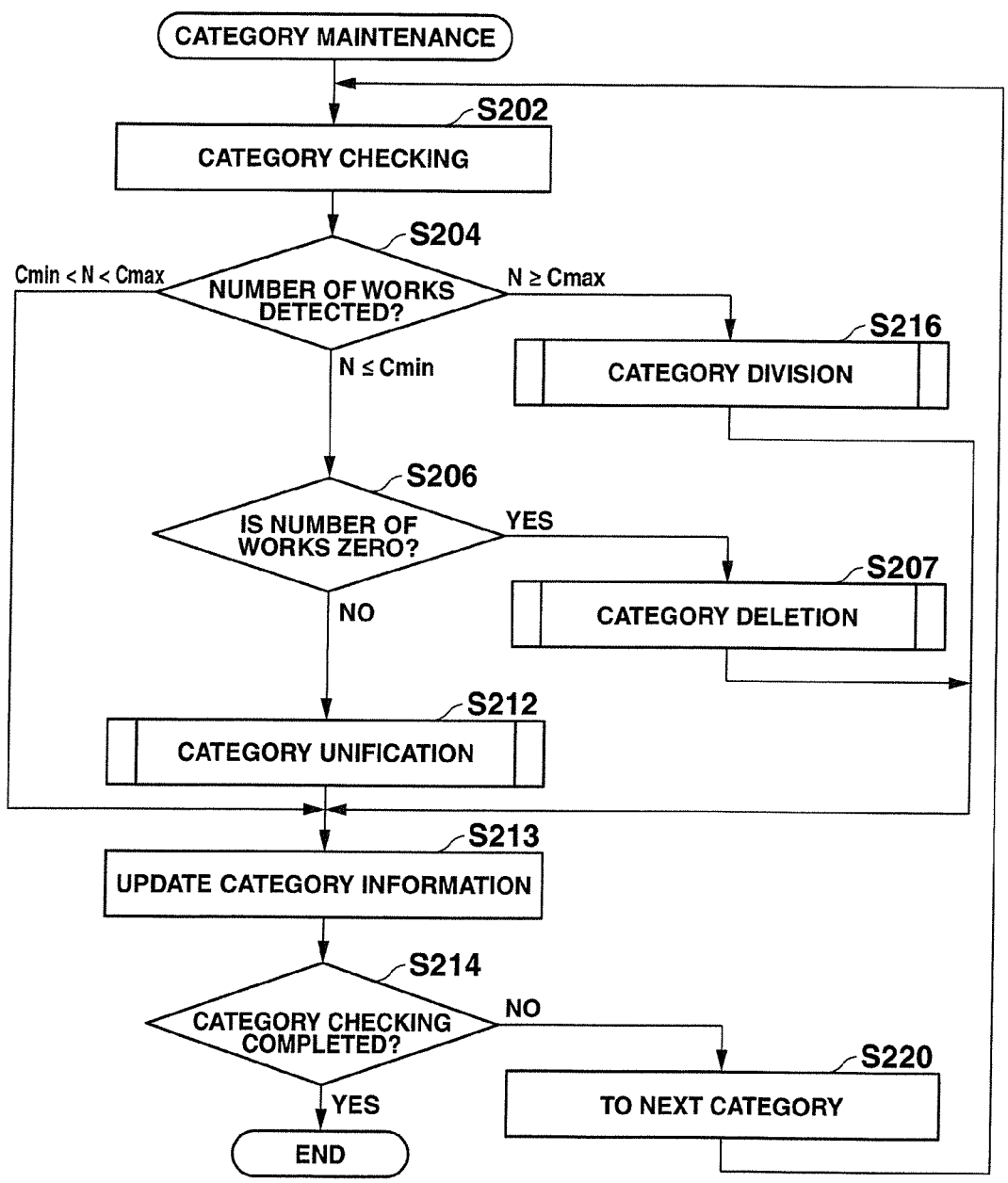
FIG. 10 is a flowchart for explaining category maintenance processing in the embodiment.

FIG. 10 is a flowchart for explaining category maintenance processing. The CPU 20 executes this processing in accordance with the program stored in the category classification unit 314.

The category maintenance processing is carried out periodically, for example, once a day or once a week.

First, currently existing categories are checked in sequence (step S202). Further, the number N of works classified as each of the categories is detected (step S204). Further, when the number N of the works is Cmin or less, the flow is advanced to step S206. It is determined in step S206 whether or not the number N of works classified as each of the categories is zero. The user can delete the work contributed by the user or stop opening of the work to the public, and hence there may be a reduction in the number of works. When the number N is zero, the category is deleted (step S207). Further, the flow is advanced to step S213.

When the number N of the works is greater than Cmin, and smaller than Cmax (Cmin<N<Cmax) in step S204, the flow is advanced to step S213 without doing anything. In step S213, there is a case where the category as which the work is classified has been changed because of the category deletion in step S207, category unification in step S212 to be described later, category division in step S216, and the like and, further there is a case where the category select CS is created in step S202 which is characteristic of this embodiment, and hence category information 206H of each work is updated.

On the one hand, when it is determined in step S206 that the number N of works classified as the category is not zero, and it is already determined in step S204 that the number N of the works classified as the category is Cmin or less, and hence the category is unified with some other category (step S212). After that, the flow is advanced to step S213 to update the category information 206H, and in step S214, it is determined whether or not category checking has totally been completed. When the category checking has not been completed yet, the flow is advanced to the next category (step S220) and, when the category checking has been completed, this flow is ended.

On the other hand, when it is determined in step S204 that the number N of works classified as the category is the predetermined number or greater, i.e., works of a number greater than or equal to the maximum number of each layer shown by Cmax in FIG. 7 are classified as the category, the flow is advanced to step S216, and division processing of the category is carried out.

Next, details of step S216 in which category division in FIG. 10 is carried out will be described below. This processing is also executed by the CPU 20 in accordance with the program stored in the category classification unit 314.

Regarding the category specified in step S202 in FIG. 10, it is determined in step S204 that the number N of works classified as the category is greater than or equal to the predetermined number, i.e., the maximum number Cmax of works which can be classified as the category. For example, in the case of the category flower C13, the number N of works exceeds 500 and, in the case of the category morning glory, the number N of works exceeds 250. Thus, by dividing this category, a one layer lower category is created.

As the specific method, a number of tree-structured categories are prepared in advance. The categories are empty at the beginning, and cannot be seen from the user. When a work is classified, a category thereof is created, and becomes visible. For example, the category configuration part of which is shown in FIG. 7 is prepared from the beginning. That is, although the category structure itself in which the first layer is the natural system C1, second layer is the flower C13, third layer is the morning glory C133, and the fourth layer is red C1311, . . . is prepared, the category structure is treated in such a manner that the category structure is not brought to the surface until the works are classified. Further, when the number N of works classified as the category flower C13 exceeds 500, tags attached to these works are classified, and are distributed to the sunflower C131, rose C132, morning glory C133, . . . in the third layer. However, not only the maximum number Cmax, but also the minimum number Cmin of works which can be classified as the category are set to each category. When the number N reaches the minimum number Cmin, a new category is established and, when the number N does not reach the minimum number Cmin, the current category is kept.

For example, in the category flower C13, when the number of works which can be classified as the category morning glory C133 is greater than or equal to 50 which is the minimum number Cmin, a category morning glory C133 is created as a new category. When the number of works which can be classified as the sunflower is less than 50, the works of the sunflower are left classified as the category flower C13 in the existing circumstances. Likewise, when the number of works which are classified as the rose is 50 or greater, a category rose C132 is created.

Likewise, in the third layer, although when the number of works which are classified as the category morning glory C133 exceeds 250 which is the maximum number Cmax, the works are divided into the categories read C1311, blue C1312, and yellow C1313 in the fourth layer, works of the number N less than 20 which is the minimum number Cmin of the fourth layer are kept in the category morning glory C133. When the number of works of red is 25, that of blue is 50, and that of yellow is 8, categories red C1311, and blue C1312 are newly created, and a category yellow C1313 is not created at this point in time.

Next, details of step S212 in which category unification in FIG. 10 is carried out will be described below. This processing is also executed by the CPU 20 in accordance with the program stored in the category classification unit 314.

The number N of works changes from day to day because of contribution and deletion by the users, and hence there is the possibility of the number of works to be classified as categories being reduced. Regarding the category specified in step S202 of FIG. 10, it is determined in step S204 that the number N of works classified as the category is less than or equal to the predetermined number, i.e., the minimum number Cmin of works which can be classified as the category. Moreover, it is determined that the access count is less than or equal to the predetermined number, and it is determined that the number of points is also less than or equal to the predetermined value.

For example, the category flower C13 is in a state where the number N of works is less than or equal to 100, and the category morning glory C133 is in a state where the number N of works is less than or equal to 50. Thus, this category is unified with some other category to thereby be absorbed into a one layer upper category.

More specifically, it is assumed that the number N of works which are classified as the category red C1311 positioned at the lower layer of the category morning glory C133 has become 19. Then, the number N is less than 20 which is the minimum number Cmin, and hence the category red C1311 is unified with the category morning glory C133 which is the upper layer. At this time, when the number N of works to be classified as the category blue C1312 in the same layer is greater than or equal to 20, the category 1312 is maintained. When the number N of works of the category yellow C1313 also in the same layer is less than or equal to 20, the category C1313 is unified with the category red C1311, and is absorbed into the category morning glory C133 in the upper layer.

In the manner described above, it is possible to adaptively change the category of the work in accordance with the evaluation information such as the number of works, access count, number of points, and the like.

Figure 11:
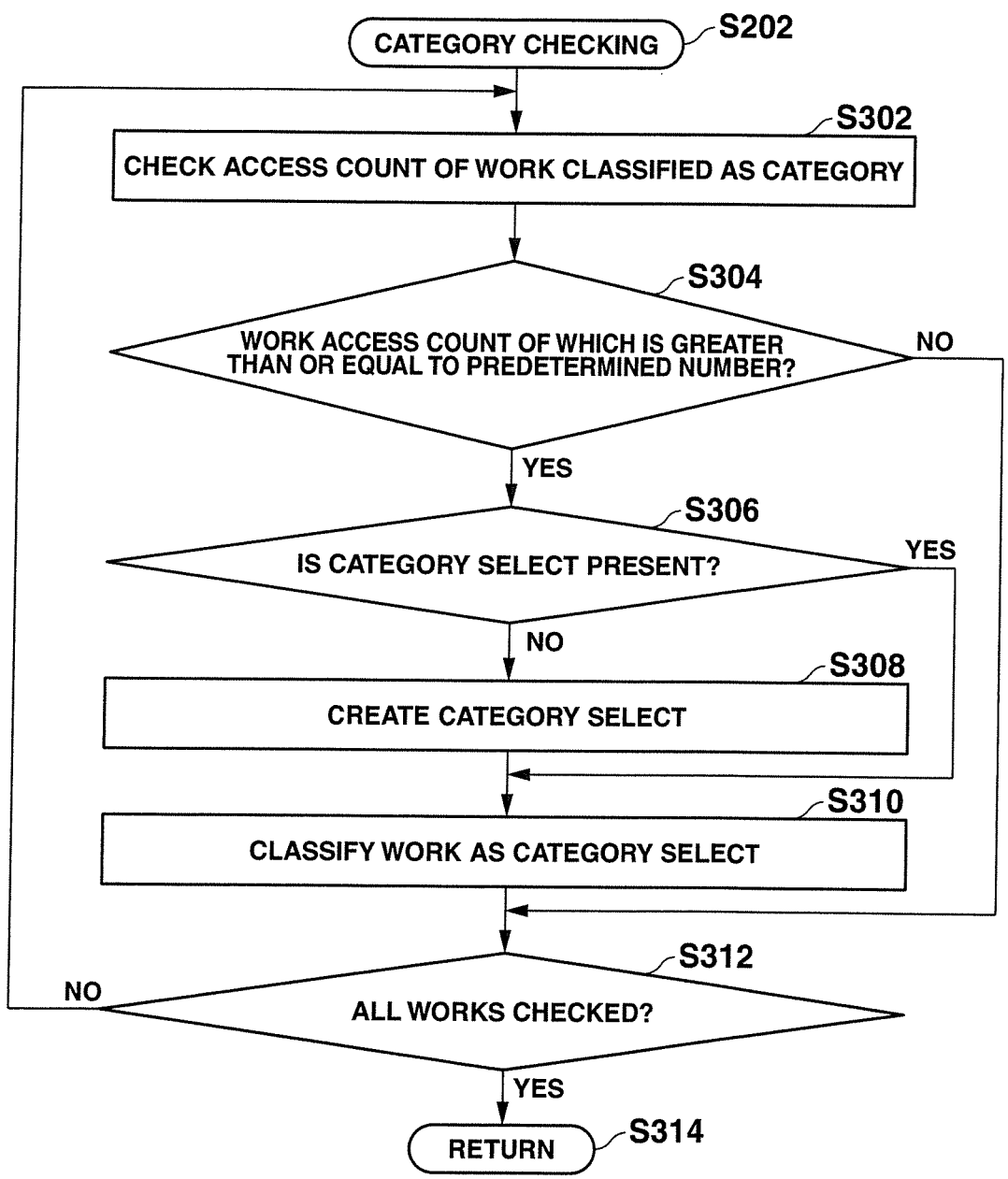
FIG. 11 is a flowchart for explaining category checking processing in the embodiment.

FIG. 11 is a flowchart showing details of category checking (step S202) in FIG. 10. This processing is also executed by the CPU 20 in accordance with the program stored in the category classification unit 314.

First, the access count of a work classified as the category in question is checked (step S302). Here, when the access count is greater than or equal to a predetermined number, for example, 100 access times/day, the flow is advanced to step S306 and, when there is no category select CS yet, a new category select CS is created (step S308) as shown in FIG. 8, and the work is classified as the category select CS (step S310). When a category select CS is already established, the flow is directly advanced to step S310, and the work is classified as the category select CS.

Further, it is determined whether or not checking of all the works classified as the category has been completed (step S312) and, when the checking is in progress, the flow is returned to step S302 and, when the checking has been completed, the flow is ended (step S314).

It is possible to realize the grouping shown in FIG. 8 by the processing described above.

As a result, it is possible to obtain a display screen shown in FIG. 12 on, for example, the display unit 400 of the terminal 1-1.

Although the embodiment of the present invention has been described above, the present invention is not limited to the above embodiment, and includes the invention described in the claims, and their equivalents.

[Explanation of Terms]

The terms appearing in this embodiment will be explained below.

In this embodiment, the user uploads image data such as a photograph or the like to a server, and opens the image data as it is or after subjecting the image data to image processing to the public on the network. The above-mentioned image data opened to the public is called a "work".

In this embodiment, regarding an access count of a work, even when the work is accessed a plurality of number of times a day with respect to one user ID, the access count is regarded as once.

In this embodiment, an access count of a work also includes a browse request number of times, and download number of times.

In this embodiment, an access count of a work implies an access count of one work in question, and access count of a category implies the sum total or the average value of access counts of all the works included in the category.

In this embodiment, the sum total of the access count of a work is the cumulative total or the average value within a predetermined period such as one day, one week, one month, and the like.

In this embodiment, a browse request of a work implies selecting one work from among a plurality of works a thumbnail of which is list-displayed on a screen, and requesting that the selected work be displayed in an enlarging manner (requesting that a real image of the selected work in the thumbnail be displayed).

In this embodiment, a download number of a work implies the number of times a real image of the work selected and browse-requested is downloaded to a user terminal.

In this embodiment, an evaluation number of a work implies the number of times the user has tapped a prepared LIKE button with respect to the work. However, even when the LIKE button is tapped a plurality of times a day with respect to one user ID, the evaluation number is regarded as a single LIKE.

In this embodiment, evaluation information of a work implies a point to be added by the user by accessing a predetermined work, issuing browse request of the work, downloading the work, or tapping the LIKE button with respect to the work, and is information indicating that the work is one the user likes.

In this embodiment, a user and member are identical in meaning. A free member, dues-paying member, and premium member are collectively called users.

In this embodiment, a thumbnail and reduced images are identical in meaning, and a real image implies a work or uploaded image data main body. When a real image is displayed on a screen, a size thereof is generally reduced, and hence a simple expression "a work, image or image data is displayed" is used.

In this embodiment, a category implies a type obtained by classifying the whole on the basis of a certain criterion.

In this embodiment, although the processing of changing the category has been collectively carried out once a day, once a week or the like, the processing may be carried out each time a work is contributed and classified.

In this embodiment, although a work is formed by subjecting a photograph uploaded by the user to picture conversion processing, an original photograph as it is or the photograph after being subjected to image processing such as cropping, red-eye correction, and the like may be used as a work.

In this embodiment, although categories have been classified as a natural system, man-made system, person, animal, scenery, flower, sunflower, rose, morning glory, red, blue, yellow, . . . , the classification is not limited to this and, for example, the first layer may be classified by color or by atmosphere (soft, hard, bright, . . . ).

Advantage of the Embodiment

According to the above-described embodiment, the configuration is formed in such a manner that the number of works to be classified in each category layer is determined in advance and, when the number of works becomes greater than the limited number, the number of category layers is automatically increased and, conversely, when the number of works decreases, the current layer is raised to the upper layer, and hence an advantage that when the number of contributed works is small, the number of categories is also small, and the user can easily view the works is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network system in which image data items are uploaded from a plurality of user terminals to a server and images are opened to public among the users, the network system including at least one central processing unit, the system comprising:
   an uploaded image storage unit configured to store image data items uploaded from the terminals;
   a work storage unit configured to store a plurality of image data items stored in the uploaded image storage unit as works for publication;
   a classification unit configured to classify the plurality of works stored in the work storage unit into a plurality of categories; and
   a category control unit configured to (i) divide the works classified into the categories into a first group of works with each of which a number of times of browse requests for a work from the terminals is greater than or equal to a predetermined number, and a second group of works other than the works in the first group, and classify one of the first and second groups of the divided works as another category different from the categories, and (ii) execute one of category unification, category division, and category deletion in accordance with a number of works included in each category, wherein category unification occurs by unifying one category with another category, category division occurs by dividing a category out from another category, and category deletion occurs by deleting a category.

2. The network system according to claim 1, wherein the work storage unit stores the image data items stored in the uploaded image storage unit as they are.

3. The network system according to claim 1, wherein the work storage unit subjects the image data items stored in the uploaded image storage unit to image processing, and stores the processed image data items.

4. A non-transitory storage medium having stored therein a computer readable program for controlling a computer of a server in which image data items are uploaded from a plurality of user terminals to the server and images are opened to public among the users, to perform functions comprising:
   storing a plurality of image data items uploaded from the terminal as they are or after subjecting the image data items to image processing as works for publication;
   classifying each of the works into one of a plurality of categories; and
   (i) dividing the works classified into the categories into a first group of works with each of which a number of times of browse requests for a work from the terminals is greater than or equal to a predetermined number, and a second group of works other than the works in the first group, and classifying one of the first and second groups of the divided works as another category different from the categories, and (ii) executing one of category unification, category division, and category deletion in accordance with a number of works included in each category, wherein category unification occurs by unifying one category with another category, category division occurs by dividing a category out from another category, and category deletion occurs by deleting a category.

5. A server in a network system in which image data items are uploaded from a plurality of user terminals to a server and images are opened to public among the users, the server including at least one central processing unit, the server comprising:
   an uploaded image storage unit configured to store image data items uploaded from the terminals;
   a work storage unit configured to store a plurality of image data items stored in the uploaded image storage unit as works for publication;
   a classification unit configured to classify the works stored in the work storage unit into a plurality of categories; and
   a category control unit configured to (i) divide the works classified into the categories into a first group of works with each of which a number of times of browse requests for a work from the terminals is greater than or equal to a predetermined number, and a second group of works other than the works in the first group, and classify one of the first and second groups of the divided works as another category different from the categories, and (ii) execute one of category unification, category division, and category deletion in accordance with a number of works included in each category, wherein category unification occurs by unifying one category with another category, category division occurs by dividing a category out from another category, and category deletion occurs by deleting a category.

* * * * *